(No Model.) 2 Sheets—Sheet 1.
G. L. PERKINS.
LOOSE PULLEY LUBRICATOR.
No. 492,831. Patented Mar. 7, 1893.
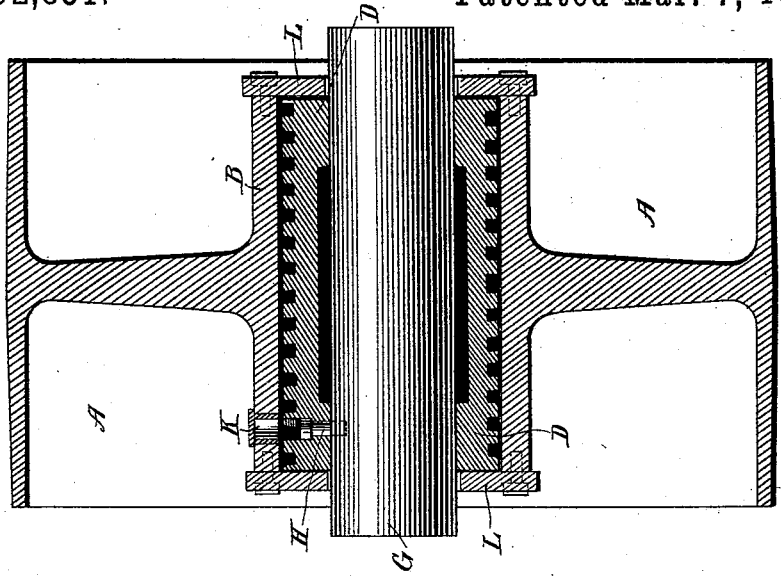
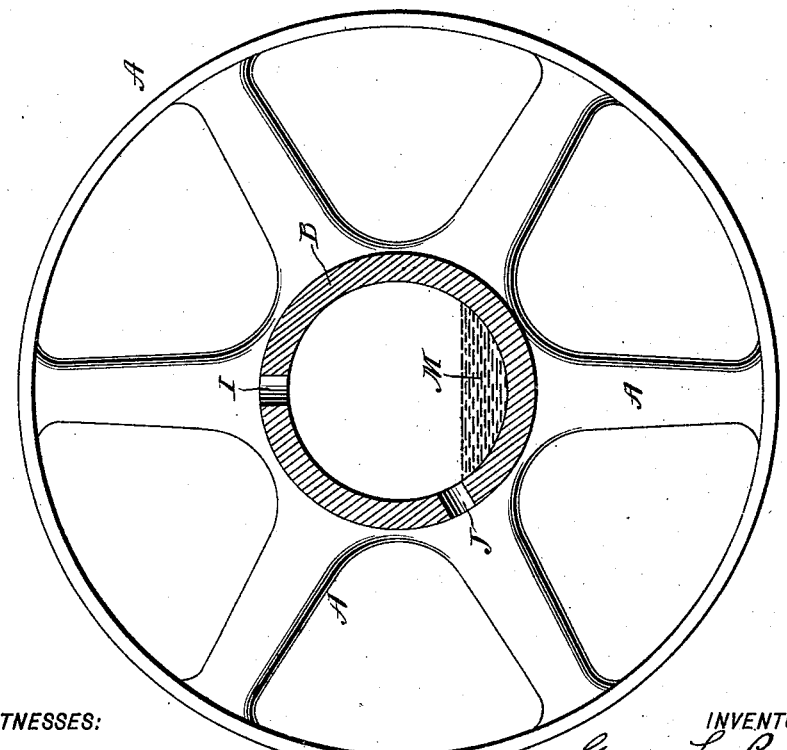
WITNESSES:
Frank S. Ober
Henry E. Everding
INVENTOR
George L. Perkins.
BY
R. C. Mitchell.
ATTORNEY.

(No Model.)  2 Sheets—Sheet 2.

G. L. PERKINS.
LOOSE PULLEY LUBRICATOR.

No. 492,831.  Patented Mar. 7, 1893.

WITNESSES:
Frank S. Ober
Henry E. Eording

INVENTOR
George L. Perkins
BY
R. C. Mitchell
ATTORNEY.

UNITED STATES PATENT OFFICE.

GEORGE L. PERKINS, OF BROOKLYN, NEW YORK.

LOOSE-PULLEY LUBRICATOR.

SPECIFICATION forming part of Letters Patent No. 492,831, dated March 7, 1893.

Application filed October 18, 1892. Serial No. 449,261. (No model.)

*To all whom it may concern:*

Be it known that I, GEORGE L. PERKINS, a resident of the city of Brooklyn, in Kings county and New York State, have invented certain new and useful Improvements in Loose Pulleys, of which the following is a full, clear, and exact specification.

My invention relates to certain new and useful improvements in loose pulleys and consists in constructing a loose-pulley so that an absolutely constant and even lubrication of the entire bearing surface is maintained, and at the same time preventing any tendency on the part of the pulley to splash or throw oil. To accomplish these objects I make use of the mechanism illustrated by the accompanying drawings in which:—

Figure 3:
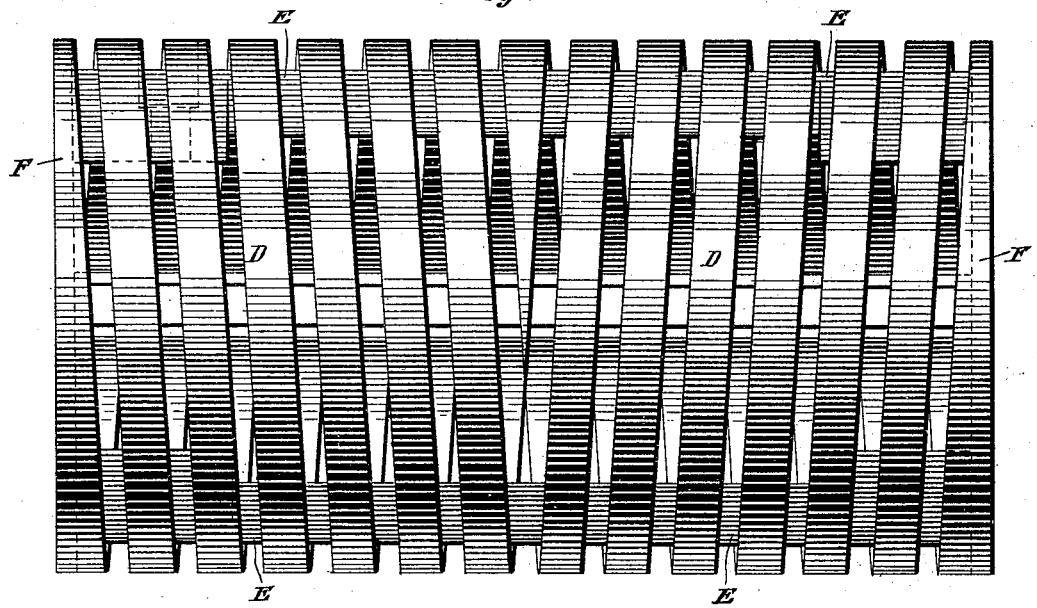
Figure 4:
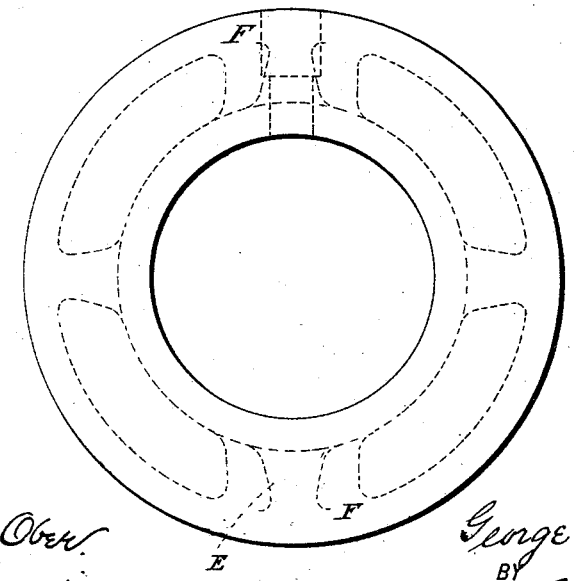

Figure 1 is a side elevation of the pulley wheel showing the hub in section. Fig. 2 is a longitudinal sectional elevation of a pulley and the therein contained bushing bearing as they appear in connection with a shaft. Fig. 3 is an enlarged side elevation of the bushing, in perspective, and Fig. 4 is an end elevation of Fig. 3 showing in dotted outline the hollow interior.

A is a pulley wheel.

B is the pulley hub.

D is a cylindrical bushing-bearing. This bushing is formed preferably of a composition metal molded in such a manner as to form a right and left hand thread meeting at or near the center of the bushing. The body of this bushing is stiffened by means of cross-bars E E running through the length of the bushing and fixed to the inner side of the threads or formed integral therewith in the casting. The ends F F of the bushing are closed for the reason hereinafter stated. The cross-bars E E rest on the shaft G (Fig. 2) preferably at or near the outer ends of the bushing as shown in the drawings, (Fig. 2.) The thickness of these bars between the ends that bear on the shaft is slightly reduced for reasons hereinafter stated. The bushing D D is fixed to the shaft G by means of a set-screw H (Fig. 2). The interior of the hub B of the pulley bears on the bushing D. It will now be seen that when the pulley and the bushing are in place, a hollow space is formed around the shaft, between the shaft the inside of the hub and the closed ends F F of the bushing (see Fig. 2). This hollow space is partially filled with the right and left threads and the cross-bars E E. An oil hole I in the hub of the pulley permits the introduction of oil M into the interior of the bearing.

J is an oil outlet or overflow in the hub. The pulley is placed on the shaft so that the oil hole I is directly over the shaft. Oil is turned in until the surface of the oil nearly reaches the lower side of the shaft when it will run out through the overflow J. A suitable cap K (Fig. 2) is then placed over each hole I and J and the oil is securely retained within the hollow space in the bearing.

L L are end pieces of ordinary construction fixed to the hub of the pulley to prevent loose side play of the pulley. These end pieces in combination with the closed ends of the bushing D absolutely prevent any oil from being thrown out.

In operation the pulley turns on the bushing which is fixed to the shaft. As the pulley revolves the oil, by means of the right and left thread, will be drawn or forced toward the center of the bushing or bearing and there tends to pile up and flow back, by gravity, toward the ends of the bearing where it again is pushed along by the thread toward the center. It will therefore be readily seen that the entire bearing surface of the pulley and bushing is constantly and evenly lubricated by reason of the fact that the space between the threads of the bushing, where the oil is carried, is constantly moving along, so long as the pulley or shaft is in motion.

I do not intend to limit myself to a skeleton bushing, the outer surface of which consists of a double screw thread, to wit, a right and left thread, for it is obvious that a single thread either right or left may be used extending over the entire length of the bushing. This form however is not as satisfactory as the form having the right and left thread. The thinning out of the cross-bars E E along the center permits the oil to pass as the shaft or pulley revolves which is necessary for the reason that the oil tends to lie at the lowest point in the hollow space and when it is piled up in the center, were it not for the space between the cross-bars and the shaft, the oil could not easily flow back toward the ends but would be carried around by the cross-bars.

Having thus described my invention, what I claim, and desire to secure by Letters Patent, is—

1. A pulley bushing consisting of a spiral band surrounding a shaft, a cavity being formed between the band and shaft for the purpose described, the exterior surface of the spiral band forming a bearing surface for the pulley hub substantially as described.

2. A loose pulley bushing consisting of a spiral band interposed between the pulley hub and the shaft and secured to the shaft, a cavity being formed between the spiral band and the shaft, the exterior surface of the said spiral band forming a bearing surface for the pulley, substantially as described.

3. The combination of the shaft G, hub B and skeleton bushing D interposed between said shaft and hub and having its periphery formed of right and left hand thread grooves, said bushing being separated at its middle from the shaft G and carried by its ends on the shaft, all substantially as and for the purpose set forth.

4. A pulley bushing consisting of bands D D spirally wound from the center of the bushing to form right and left thread grooves, said bands being secured together by the longitudinal cross-pieces E E, the exterior surface of the bushing forming the bearing surface for the pulley, and the end pieces F F, all arranged substantially as and for the purpose described.

GEORGE L. PERKINS.

Witnesses:
R. C. MITCHELL,
HENRY E. EVERDING.